United States Patent
Peng et al.

(10) Patent No.: US 9,075,574 B2
(45) Date of Patent: Jul. 7, 2015

(54) TOUCH PANEL AND TOUCH DISPLAY PANEL

(71) Applicant: AU Optronics Corp., Hsin-Chu (TW)

(72) Inventors: Chia-Chien Peng, Hsin-Chu (TW); Chi-Sheng Chen, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 145 days.

(21) Appl. No.: 13/935,567

(22) Filed: Jul. 5, 2013

(65) Prior Publication Data
US 2014/0160366 A1    Jun. 12, 2014

(30) Foreign Application Priority Data
Dec. 11, 2012    (TW) ............................ 101146688 A

(51) Int. Cl.
G02F 1/1335    (2006.01)
G06F 1/16    (2006.01)

(52) U.S. Cl.
CPC ................................. G06F 1/1643 (2013.01)

(58) Field of Classification Search
CPC ................................................. G06F 1/1643
USPC ........................................... 349/12; 345/173
See application file for complete search history.

(56) References Cited

U.S. PATENT DOCUMENTS

| | | | |
|---|---|---|---|
| 6,181,344 B1* | 1/2001 | Tarpenning et al. | 715/863 |
| 7,440,118 B2 | 10/2008 | Uda | |
| 7,540,620 B2* | 6/2009 | Weller et al. | 359/879 |
| 7,808,608 B2* | 10/2010 | Park et al. | 349/191 |
| 2009/0128754 A1* | 5/2009 | Suzuki et al. | 349/106 |
| 2009/0185115 A1* | 7/2009 | Nishida et al. | 349/106 |
| 2011/0115723 A1* | 5/2011 | Wang et al. | 345/173 |
| 2011/0242465 A1* | 10/2011 | Lee et al. | 349/110 |
| 2012/0026107 A1* | 2/2012 | Kim et al. | 345/173 |
| 2012/0256851 A1 | 10/2012 | Wang | |
| 2013/0106746 A1* | 5/2013 | Lai et al. | 345/173 |
| 2013/0168220 A1* | 7/2013 | Ho et al. | 200/600 |
| 2013/0234996 A1* | 9/2013 | Hecht | 345/177 |

FOREIGN PATENT DOCUMENTS

| | | |
|---|---|---|
| TW | M421544 | 1/2012 |
| TW | M437991 | 9/2012 |
| TW | 201241684 | 10/2012 |

* cited by examiner

*Primary Examiner* — Sang V Nguyen
(74) *Attorney, Agent, or Firm* — Winston Hsu; Scott Margo

(57) ABSTRACT

A touch panel includes a substrate, a touch device, a white translucent pattern, a color filter pattern and a reflection pattern. The substrate has a transparent region and an opaque region surrounding the transparent region. The touch device is disposed on the substrate in the transparent region. The white translucent pattern is disposed on the substrate in the opaque region. The color filter pattern stacks on the white translucent pattern in the opaque region. The reflection pattern stacks on the color filter pattern in the opaque region.

10 Claims, 12 Drawing Sheets

TOUCH PANEL AND TOUCH DISPLAY PANEL

BACKGROUND OF THE INVENTION

1. Field of the Invention

The present disclosure relates to a touch panel and a touch display panel, and more particularly, to a touch panel and a touch display panel with colorful border.

2. Description of the Prior Art

Because of the characteristics of human-computer interaction and various design possibilities, touch panels have been widely applied to the external input interfaces of many electronic products. In recent years, as the applications of electronic products have developed diversely, consumer electronics with the integration of touch sensing functions and display panels, such as smart phones and tablet personal computers (PCs), are commercialized and have evolved flourishingly. A touch panel has a touch sensing region and a border region. In the touch sensing region, a touch device is disposed to implement touch capabilities. In the border region, metallic wires are disposed to electrically connect to the touch device for transmitting touch sensing signals. Based on aesthetic consideration, there is an opaque pattern to shield the metallic wires in the border region of the conventional touch panel. Generally, the conventional opaque pattern includes a black opaque pattern and a white opaque pattern. Although the black opaque pattern can perfectly shield the metallic wires, it sometimes fails to match the overall exterior. Similarly, if the white opaque pattern is applied to electronic products other than the white ones, the coordinated results turn out inharmoniously.

SUMMARY OF THE INVENTION

It is one of the objectives of the disclosure to provide a touch panel and a touch display panel with colorful borders, thereby increasing aesthetics of the touch panel and the touch display panel.

An embodiment of the disclosure provides a touch panel. The touch panel includes a substrate, a touch device, a white translucent pattern, a color filter pattern and a reflection pattern. The substrate has a transparent region and an opaque region surrounding the transparent region. The touch device is disposed in the transparent region of the substrate. The white translucent pattern is disposed in the opaque region of the substrate. The color filter pattern is disposed in the opaque region of the substrate and stacks on the white translucent pattern. The reflection pattern is disposed in the opaque region of the substrate and stacks on the color filter pattern.

Another embodiment of the disclosure provides a touch display panel. The touch display panel includes a display panel and a touch panel. The display panel has a display surface. The touch panel includes a substrate, a touch device, a white translucent pattern, a color filter pattern and a reflection pattern. The substrate has a transparent region and an opaque region surrounding the transparent region. The substrate has a surface facing the display surface of the display panel. The touch device is disposed in the transparent region of the substrate. The white translucent pattern is disposed in the opaque region of the substrate. The color filter pattern is disposed in the opaque region of the substrate and stacks on the white translucent pattern. The reflection pattern is disposed in the opaque region of the substrate and stacks on the color filter pattern.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present disclosure, features of the embodiments will be made in detail. The embodiments of the present disclosure are illustrated in the accompanying drawings with numbered elements.

Figure 1:
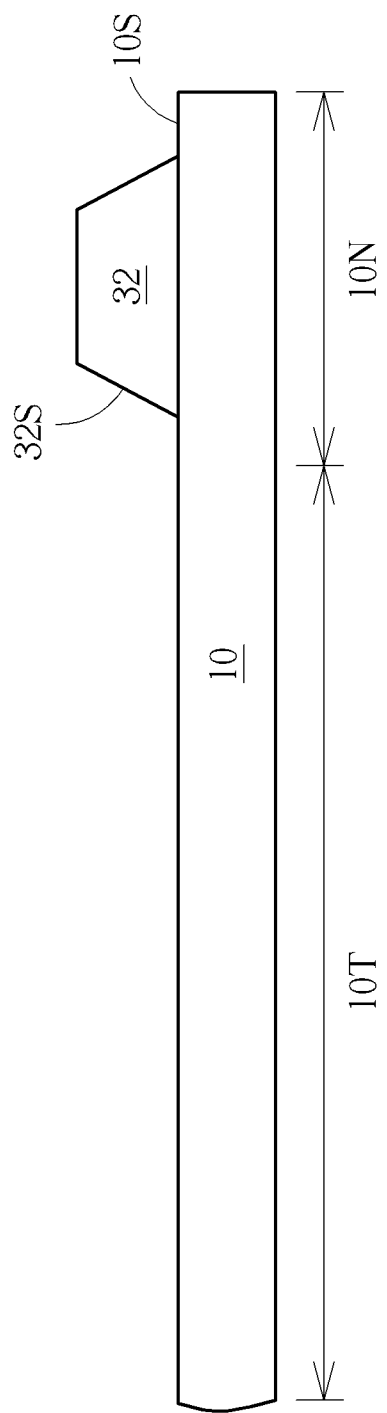
FIGS. 1-8 are schematic diagrams illustrating a method for fabricating a touch panel according to a first embodiment of the present disclosure.

Please refer to FIGS. 1-8. FIGS. 1-8 are schematic diagrams illustrating a method for fabricating a touch panel according to a first embodiment of the present disclosure. As shown in FIG. 1, a substrate 10 is provided first. The substrate 10 may be a transparent substrate, for example, a glass substrate or a plastic substrate, but not limited thereto. The substrate 10 has a transparent region 10T and an opaque region 10N. The opaque region 10N may be disposed in one, two or three sides of the transparent region 10T or surround the transparent region 10T. A white translucent pattern 32 is then formed in the opaque region 10N of the surface 10S of the substrate 10. Preferably, the white translucent pattern 32 is only formed in the opaque region 10N of the surface 10S of the substrate 10 and is not formed in the transparent region 10T of the surface 10S of the substrate 10. The white translucent pattern 32 is translucent and clear enough to allow a portion of white light (i.e., ambient light) to pass through but not transparent—that is to say, after white light penetrates the white translucent pattern 32, light intensity reduces but the original spectrum substantially maintains. The optical density and the thickness of the white translucent pattern 32 can be modified according to the visual quality of the exterior. The optical density of the white translucent pattern 32 is substantially in a range of 0.5 to 5, and preferably in a range of 0.5 to 2.5, but not limited thereto. The material of the white translucent pattern 32 may include, for example, white photoresist. The white translucent pattern 32 may be patterned by an exposure process and a development process, but not limited thereto, for example, ink jet printing process, screen printing process, or other suitable processes. Moreover, the white translucent pattern 32 preferably has inclined sidewalls 32S to prevent broken-line defects on the following layers.

Figure 2:
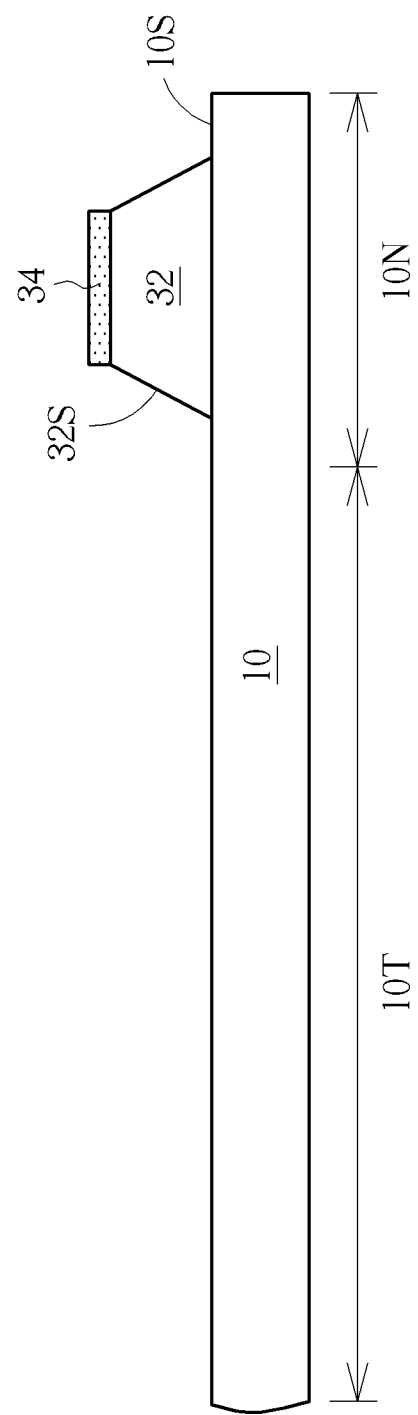

As shown in FIG. 2, a color filter pattern 34 is subsequently formed on the white translucent pattern 32. Preferably, the color filter pattern 34 is only formed in the opaque region 10N of the surface 10S of the substrate 10 and is not formed in the transparent region 10T of the surface 10S of the substrate 10. In this embodiment, the color filter pattern 34 only stacks on the upper surface of the white translucent pattern 32, but not limited thereto. For example, the color filter pattern 34 may further cover the inclined sidewalls 32S of the white translucent pattern 32. The color filter pattern 34 may be permeable to light of specific wavelength range but absorb the light beyond the specific range. In other words, the white light passing through the color filter pattern 34 turns into color light. In this embodiment, the color of the color filter pattern 34 is determined according to the visual quality of the exterior, and it may be for example red, green, blue, or other colors. The material of the color filter pattern 34 may include, for example, colorful photoresist. The color filter pattern 34 may be patterned by an exposure process and a development process, but not limited thereto, for example, ink jet printing process, screen printing process, or other suitable processes. Furthermore, the color filter pattern 34 may be a single-layered color filter pattern, such as a red color filter pattern, a green color filter pattern, a blue color filter pattern or a color filter pattern of any other color. The shade of the color filter pattern 34 may be modified by changing the thickness or the material of the color filter pattern 34. In a variant embodiment, the color filter pattern 34 may be a multiple-layered color filter pattern and may be formed by stacking color filter patterns of different colors. For example, the color filter pattern 34 may be formed by stacking at least two types of color filter patterns selecting from a red color filter pattern, a green color filter pattern, a blue color filter pattern, and color filter patterns of other colors to meet the desired visual exterior.

Figure 3:
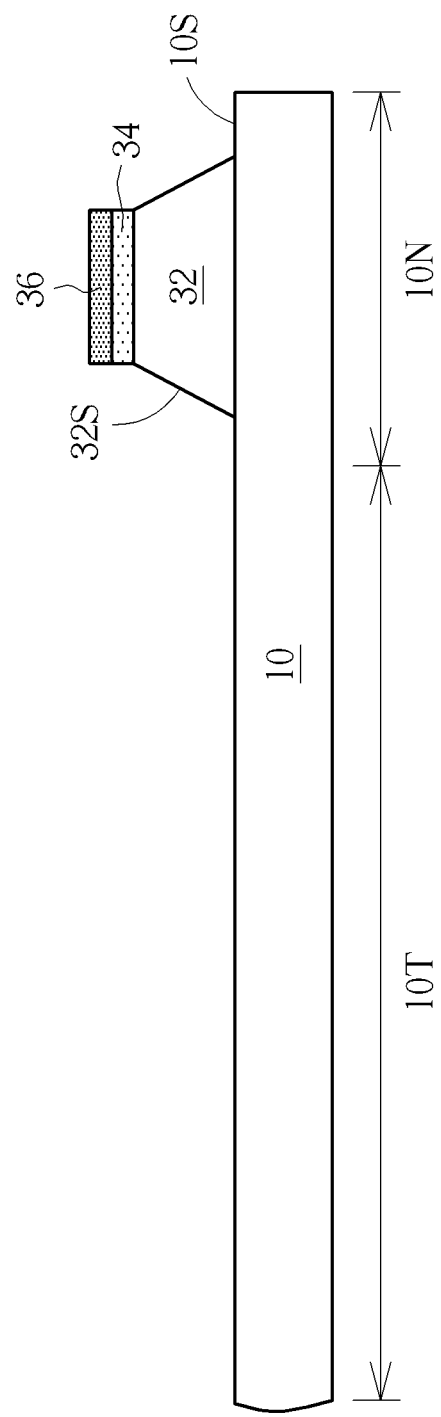

As shown in FIG. 3, a reflection pattern 36 is then formed on the color filter pattern 34. The reflection pattern 36 may be, for example, a metal pattern, and may be patterned by a photolithography process and an etching process, but not limited thereto, for example, ink jet printing process, screen printing process, or other suitable processes. In this embodiment, the reflection pattern 36 only stacks on the upper surface of the color filter pattern 34, but not limited thereto. For example, the reflection pattern 36 may further cover at least one of the sidewalls of the color filter pattern 34 or the inclined sidewalls 32S of the white translucent pattern 32.

Figure 4:
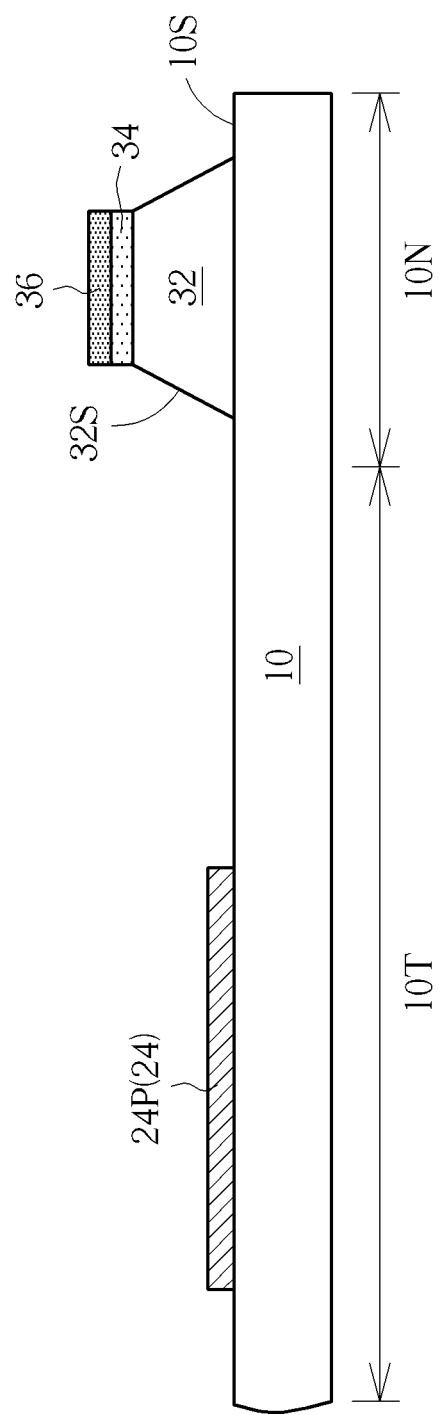

As shown in FIG. 4, a patterned conductive layer 24 is subsequently formed in the transparent region 10T of the substrate 10. The patterned conductive layer 24 may include a plurality of bridge lines 24P. The patterned conductive layer 24 may include a patterned transparent conductive layer, such as an indium tin oxide (ITO) layer, or a patterned opaque conductive layer, such as a metal layer. The patterned conductive layer 24 may be patterned by a photolithography process and an etching process, but not limited thereto, for example, ink jet printing process, screen printing process, or other suitable processes.

Figure 5:
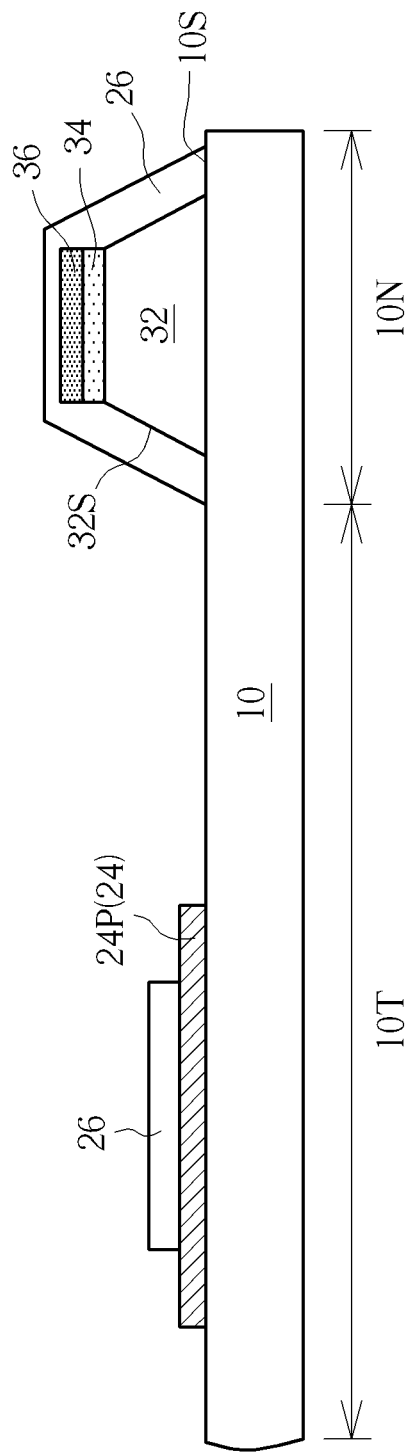

As shown in FIG. 5, an insulation layer 26 is then formed on the substrate 10. In the transparent region 10T, the insulation layer 26 partially covers and partially exposes the bridge lines 24P. In the opaque region 10N, the insulation layer 26 covers the white translucent pattern 32, the color filter pattern 34 and the reflection pattern 36. The insulation layer 26 may include single layer structure or multi-layer structure. The materials of the insulation layer 26 may include inorganic insulation layer, such as silicon oxide, silicon nitride, silicon oxynitride or organic insulation layer, such as acrylic resin, photoresist, but not limited thereto.

Figure 6:
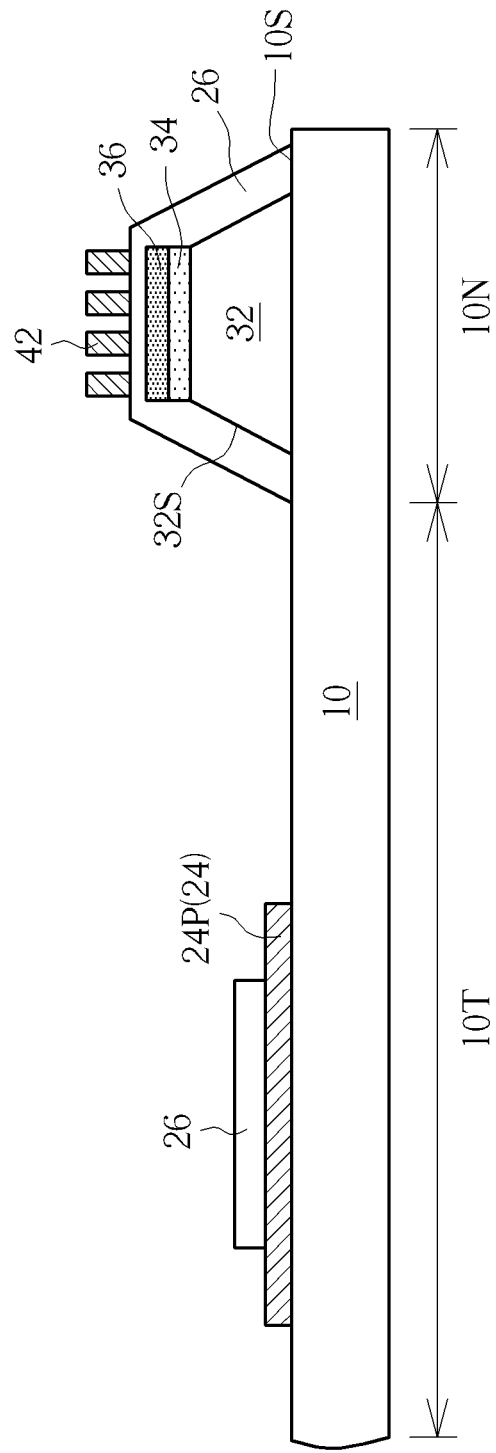

As shown in FIG. 6, wires 42 are subsequently formed on the insulation layer 26 of the opaque region 10N of the substrate 10. Because the insulation layer 26 is disposed between the reflection pattern 36 and the wires 42, it avoids short circuits between the reflection pattern 36 and the wires 42. With proper reflectivity and opacity, the reflection pattern 36 not only covers the wires 42 to shield the wires 42 from the viewer but also reflects the light passing through both the white translucent pattern 32 and the color filter pattern 34. Consequently, the opaque region 10N exhibits colorful appearance, which provides visual quality and aesthetics. The reflection pattern 36 may be, for example, a metal pattern, and can be patterned by a photolithography process and an etching process, but not limited thereto.

Figure 7:
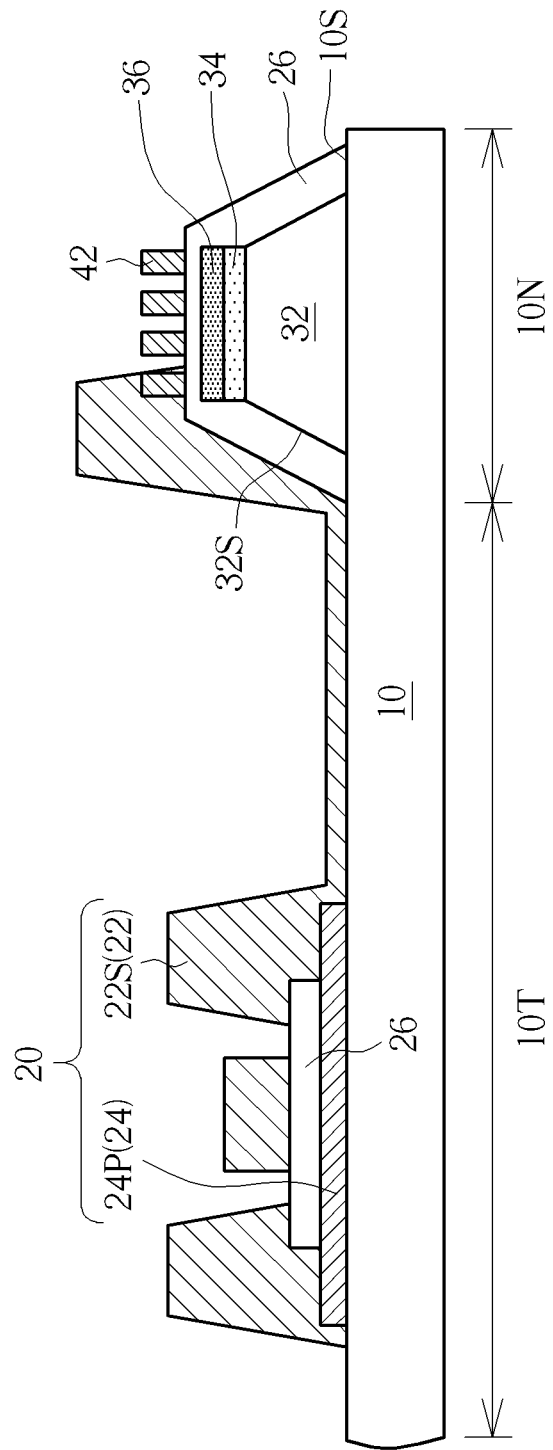

As shown in FIG. 7, the patterned conductive layer 22 is then formed on the substrate 10. The patterned conductive layer 22 may include a plurality of sensing pads 22S. The sensing pads 22S may be further divided into the sensing pads 22S (e.g., X-pads) for detecting the coordinate of one axis, such as X-axis, and the sensing pads 22S (e.g., Y-pads) for detecting the coordinate of another axial, such as Y-axis. The adjacent X-pads can be directly connected to each other, while the adjacent Y-pads are not directly connected to each other but electrically connected to each other through the bridge lines 24P exposed by the insulation layer 26. The patterned conductive layer 22 may include a patterned transparent conductive layer, such as an indium tin oxide layer. The patterned conductive layer 22 may be patterned by a photolithography process and an etching process, but not limited thereto, for example, ink jet printing process, screen printing process, or other suitable processes. The sensing pads 22S are disposed in the transparent region 10T of the substrate 10, and a portion of the sensing pads 22S may further extend to the opaque region 10N and electrically connect to the wires 42, for example, the sensing pads 22s in the X-axis are disposed in the transparent region 10T of the substrate 10, and a portion of the sensing pads 22S may further extend to the opaque region 10N and electrically connect to the wires 42 in the Y-axis, the sensing pads 22s in the X-axis are disposed in the transparent region 10T of the substrate 10, and a portion of the sensing pads 22S may further extend to the opaque region 10N and electrically connect to the wires 42 in the Y-axis, wherein the sensing pads 22s in the X-axis are not contacted with and not electrically connected to the sensing pads 22s in the Y-axis, and the wires 42 in the X-axis are not contacted with and not electrically connected to the wires 42 in the Y-axis. Because the white translucent pattern 32 has the inclined sidewalls 32S, the sidewalls of the white translucent pattern 32 are not too steep to cause the open circuit risk in the manufacture process of forming the sensing pads 22S. The sensing pads 22S and the bridge lines 24P constitute the touch device 20 which implements touch capabilities. In addition, the order in which the sensing pads 22S and the bridge lines 24P are formed is not restricted. For example, in this embodiment, the sensing pads 22S are formed after the bridge lines 24P, while in a variant embodiment, the sensing pads 22S are formed before the bridge lines 24P. The touch device 20 of this embodiment is a capacitive touch device, but not limited thereto. For example, the touch device 20 may also be a resistive touch device, an optical touch device, an electromagnetic touch device or any other types of touch devices.

Figure 8:
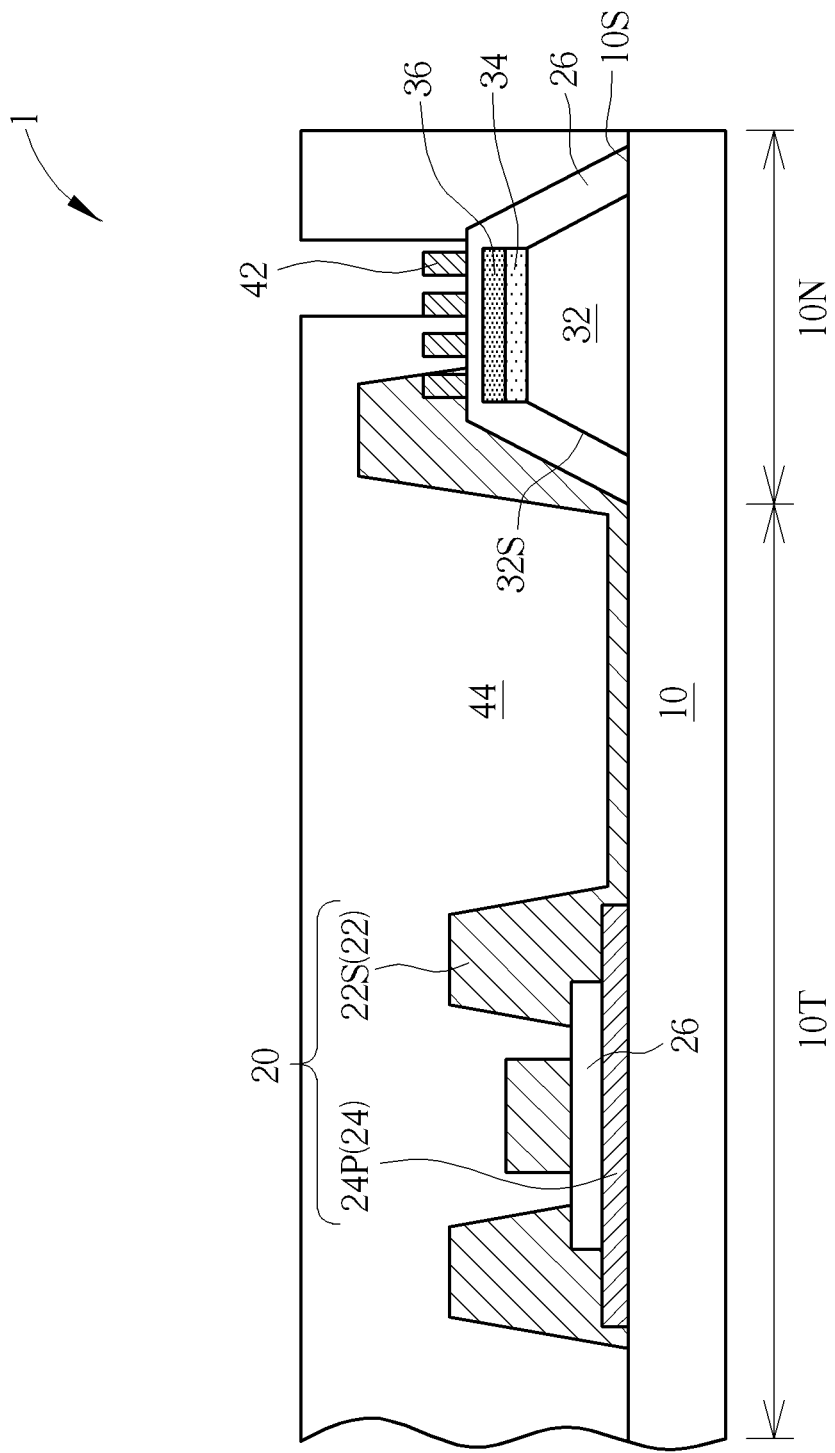

As shown in FIG. 8, lastly, a planarization layer 44 is formed on the substrate 10. The planarization layer 44 is patterned to expose a portion of the wires 42 so that the wires 42 may further electrically connect to external terminals. Accordingly, the touch panel 1 in this embodiment is accomplished.

Figure 9:
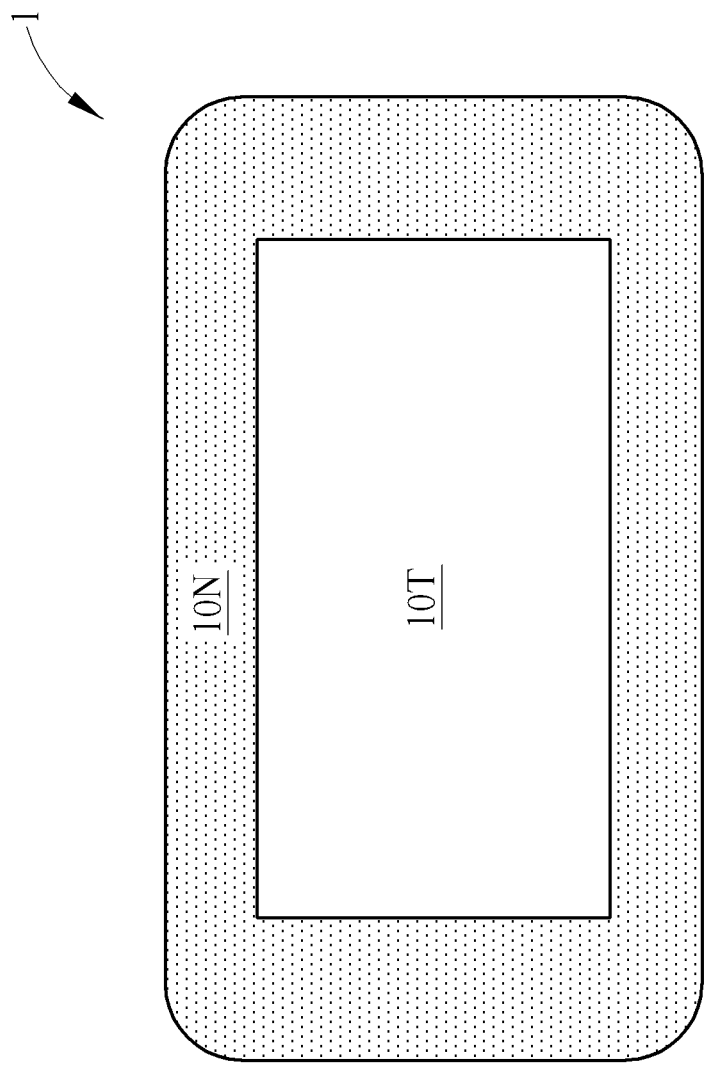
FIG. 9 is a schematic diagram illustrating the exterior of the touch panel according to the first embodiment of the present disclosure.

Please refer to FIG. 9, and also refer to FIG. 8. FIG. 9 is a schematic diagram illustrating the exterior of the touch panel according to the first embodiment of the present disclosure. As shown in FIGS. 8 and 9, in this embodiment, the white translucent pattern 32, the color filter pattern 34 and the reflection pattern 36 are sequentially stacked on the substrate 10 in the opaque region 10N of the touch panel 1, so light passing through the substrate 10 penetrates the white translucent pattern 32 and the color filter pattern 34 in sequence and is then reflected by the reflection pattern 36. In other words, the white translucent pattern 32 and the color filter pattern 34 are only stacked on the substrate 10 in the opaque region 10N of the touch panel 1 and are not stacked on the substrate 10 in the transparent region 10T of the touch panel 1. As a result, the exterior of the opaque region 10N has the same color as the color filter pattern 34. Compared with the opaque regions of only black or only white in the conventional touch panels, the borders of the touch panel 1 in this embodiment can be colorful, thereby improving the exterior aesthetics of the border and shielding the wires 42 at the same time.

Touch panels are not restricted to the preceding embodiments in the present disclosure. Other embodiments or modifications will be detailed in the following description. In order to simplify and show the differences or modifications between the following embodiments and the above-mentioned embodiment, the same numerals denote the same components in the following description, and the similar parts are not detailed redundantly.

Figure 10:
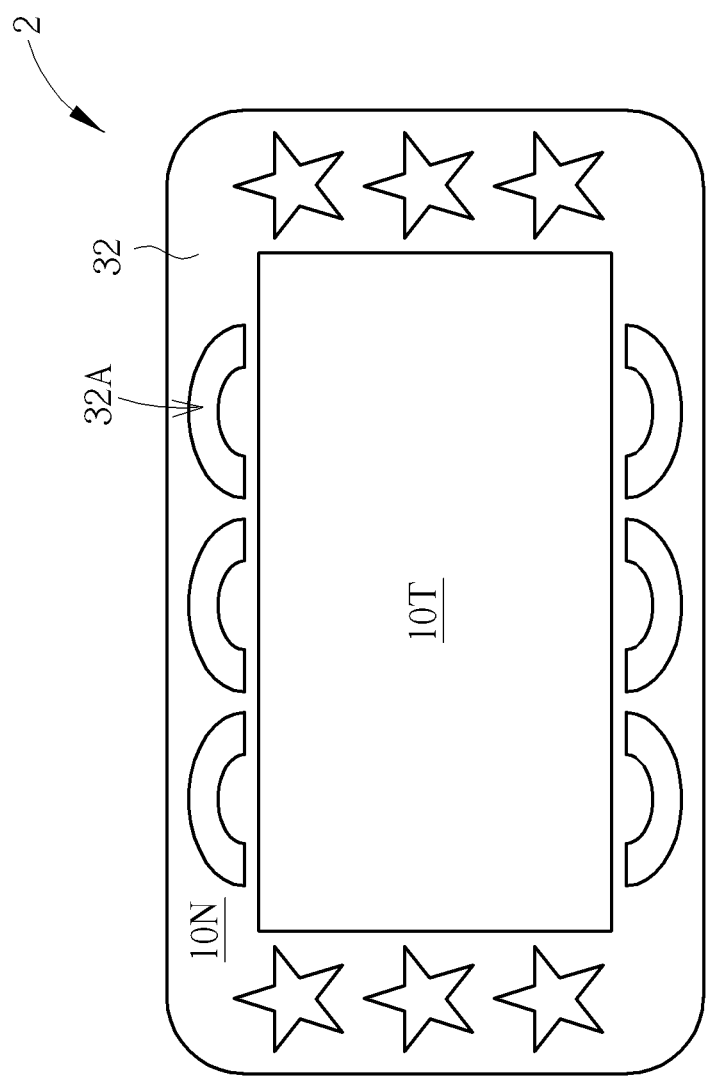
FIGS. 10-11 are schematic diagrams illustrating a touch panel according to a second embodiment of the present disclosure.
Figure 11:
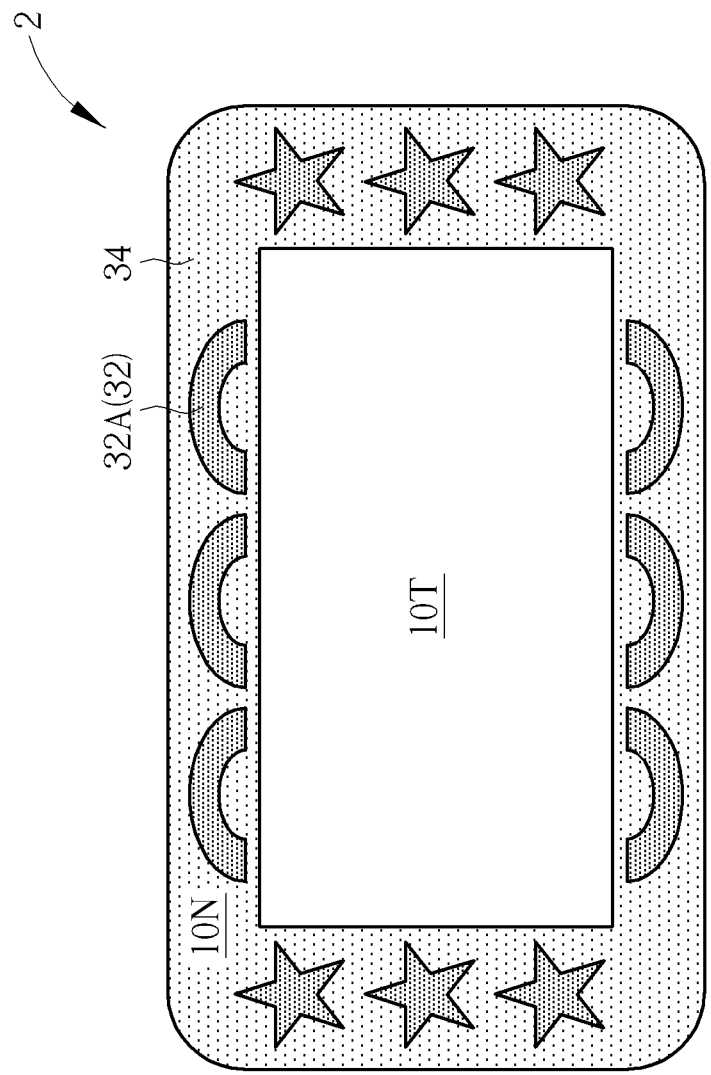

Please refer to FIGS. 10-11, and also refer to FIGS. 8-9. FIGS. 10-11 are schematic diagrams illustrating a touch panel according to a second embodiment of the present disclosure. For brevity purposes, the color filter pattern is not shown in FIG. 10. As shown in FIG. 10, in the touch panel 2 of this embodiment, the white translucent pattern 32 has at least one opening 32A. Preferably, the at least one opening 32A is expose the surface of the substrate 10 in the opaque region 10N and the white translucent pattern 32 is not existed in the opening 32A. In other embodiment, thickness of the white translucent pattern 32 in the opening 32A is less than thickness of other portion of the white translucent pattern 32. The number and the shape of the openings 32A may be appropriately modified according to different design considerations. As shown in FIG. 11, the color filter pattern 34 is disposed on the white translucent pattern 32 and in the openings 32A. In this condition, the color of the color filter pattern 34 in the region corresponding to the white translucent pattern 32 may be lighter while the color of the color filter pattern 34 in the region corresponding to the openings 32A may be deeper. For example, if the color filter pattern 34 is a green color filter pattern, the color of the color filter pattern 34 in the region corresponding to the white translucent pattern 32 may be light green while the color of the color filter pattern 34 in the region corresponding to the openings 32A may be deep green. Consequently, with the openings, the touch panel 2 in this embodiment is of more variation in visual design.

Figure 12:
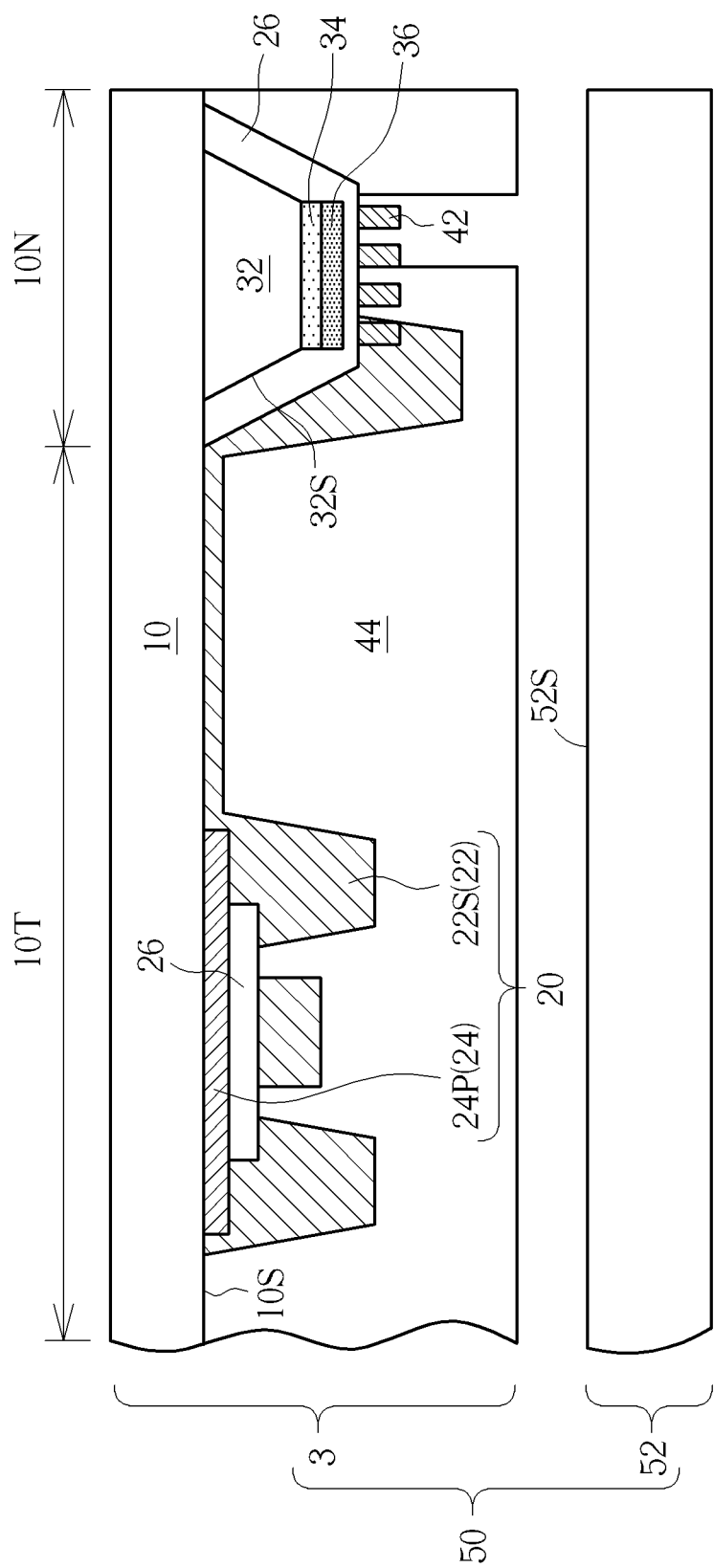
FIG. 12 is a schematic diagram illustrating a touch display panel according to an embodiment of the present disclosure.

Please refer to FIG. 12, and also refer to FIGS. 1-11. FIG. 12 is a schematic diagram illustrating a touch display panel according to an embodiment of the present disclosure. As shown in FIG. 12, the touch display panel 50 in this embodiment includes a display panel 52 and a touch panel 3. The display panel 52 has a display surface 52S. The display panel 52 may be a non-self-luminous display panel or a self-luminous display panel. Non-self-luminous display panels may include, for example but not limited to, liquid crystal display (LCD) panels (such as horizontal electric field type liquid crystal display panels, vertical electric field type liquid crystal display panels, optically compensated bend (OCB) liquid crystal display panels, cholesteric liquid crystal displays, blue phase liquid crystal displays, or other suitable liquid crystal display panels), electro-phoretic display panels, electrowetting display panels, or other suitable non-self-luminous display panel. On the other hand, self-luminous display panels include, for example but not limited to, organic electroluminescent display panels, plasma display panels, field emission display (FED) panels, or other suitable self-luminous display panels.

The touch panel 3 may be selected from the touch panel in any one of the embodiments of the present disclosure and its structure and arrangement are detailed in FIGS. 1-11 and related illustration. The surface 10S of the substrate 10 of the touch panel faces the display surface 52S of the display panel 52. Similarly, by stacking the white translucent pattern 32, the color filter pattern 34 and the reflection pattern 36 sequentially on the substrate 10 of the opaque region 10N of the touch panel 3, the borders of the touch display panel 50 may have various colorful designs, thereby improving the exterior aesthetics of the border.

To sum up, the touch panels and the touch display panels in this embodiment utilize the stacked structure of the white translucent pattern, the color filter pattern and the reflection pattern, so the borders of the touch display panel may have various colorful designs, thereby immensely improving the exterior aesthetics of the border.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
   a substrate, having a transparent region and an opaque region surrounding the transparent region;
   a touch device, disposed in the transparent region of the substrate;
   a white translucent pattern, disposed in the opaque region in direct contact with the substrate;
   a color filter pattern, disposed in the opaque region of the substrate and stacking on the white translucent pattern; and
   a reflection pattern, disposed in the opaque region of the substrate and stacking on the color filter pattern.

2. The touch panel according to claim 1, wherein an optical density of the white translucent pattern is substantially in a range of 0.5 to 5.

3. The touch panel according to claim 1, wherein the white translucent pattern has an inclined sidewall.

4. The touch panel according to claim 1, wherein the color filter pattern comprises at least one of a red color filter pattern, a green color filter pattern and a blue color filter pattern.

5. The touch panel according to claim 1, wherein the white translucent pattern has at least one opening, and the color filter pattern is disposed on the white translucent pattern and the at least one opening.

6. A touch display panel, comprising:
   a display panel, having a display surface; and
   a touch panel, comprising:
       a substrate, having a transparent region and an opaque region surrounding the transparent region, wherein the substrate has a surface facing the display surface of the display panel;
       a touch device, disposed on the surface of the substrate and in the transparent region;
       a white translucent pattern, disposed on the surface in direct contact with the substrate and in the opaque region;
       a color filter pattern, disposed on the surface of the substrate and in the opaque region, wherein the color filter pattern stacks on the white translucent pattern; and
       a reflection pattern, disposed on the surface of the substrate and in the opaque region, wherein the reflection pattern stacks on the color filter pattern.

7. The touch display panel according to claim 6, wherein an optical density of the white translucent pattern is substantially in a range of 0.5 to 5.

8. The touch display panel according to claim 6, wherein the white translucent pattern has an inclined sidewall.

9. The touch display panel according to claim 6, wherein the color filter pattern comprises at least one of a red color filter pattern, a green color filter pattern and a blue color filter pattern.

10. The touch display panel according to claim 6, wherein the white translucent pattern has at least one opening, and the color filter pattern is disposed on the white translucent pattern and the at least one opening.

\* \* \* \* \*